May 8, 1962 R. D. KOBS 3,032,927
COMBINATION SEED MERCHANDISING AND GERMINATING PACKAGE
Filed April 4, 1960 2 Sheets-Sheet 1

INVENTOR.
ROGER D. KOBS
BY
Merchant & Merchant
ATTORNEYS

May 8, 1962  R. D. KOBS  3,032,927
COMBINATION SEED MERCHANDISING AND GERMINATING PACKAGE
Filed April 4, 1960  2 Sheets-Sheet 2
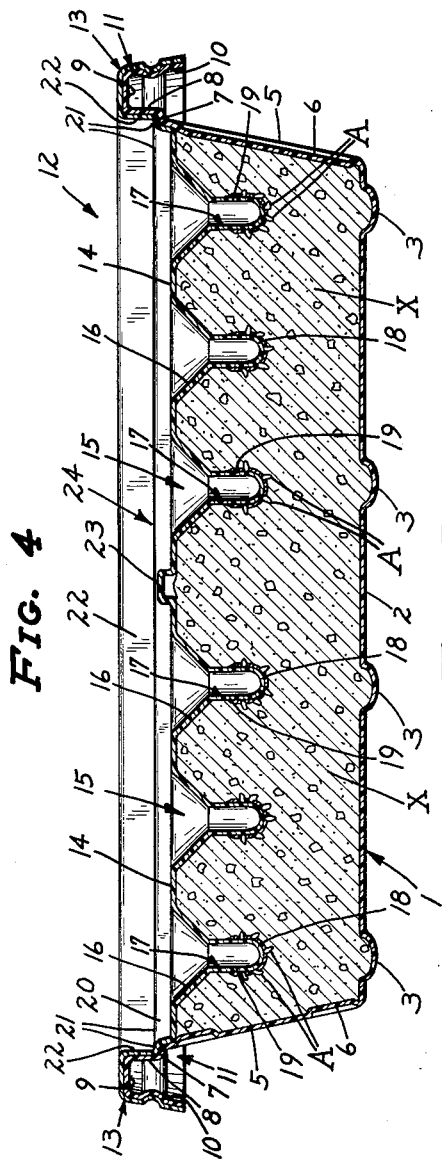
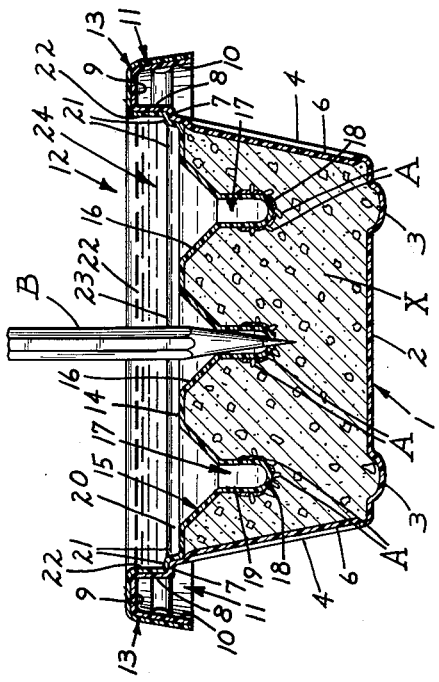
INVENTOR.
ROGER D. KOBS
BY
*Merchant & Merchant*
ATTORNEYS United States Patent Office 3,032,927
Patented May 8, 1962

3,032,927
COMBINATION SEED MERCHANDISING AND GERMINATING PACKAGE
Roger D. Kobs, Minneapolis, Minn., assignor to Northrup, King & Co., Minneapolis, Minn., a corporation of Minnesota
Filed Apr. 4, 1960, Ser. No. 19,585
3 Claims. (Cl. 47—37)

My invention relates to combination seed merchandising and germinating packages and is in the nature of an improvement upon the structure disclosed and broadly claimed in my Patent 2,893,168 of date July 7, 1959, and entitled, "Combination Seed Merchandising and Germinating Package."

More specifically my invention relates to improvements in the dibble-forming, seed-carrying tops for such devices, and has for its primary object the provision of novel means for assuring a more positive deposit or release of the seeds initially secured to the undersurfaces of the dibbles formed in said tops.

A further object of my invention is the provision of novel means for more positively precluding the escape of potting material from the containers during handling and shipment.

A still further and important object of my invention is the provision of means for increasing the efficiency, rigidity, and strength to said tops without increasing the cost of producing same.

The above and still further objects of my invention will become apparent from the following detailed specification, appended claims, and attached drawings.

Referring to the drawings wherein like characters indicate like parts throughout the several views:

FIG. 4 is a view in longitudinal section taken on the line 4—4 of FIG. 2; and

FIG. 5 is a view in transverse section taken on the line 5—5 of FIG. 2.

Figure 1:
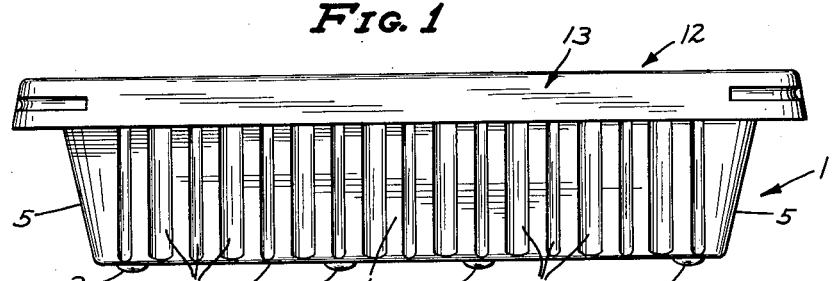
FIG. 1 is a view in side elevation of my novel structure.
Figure 2:
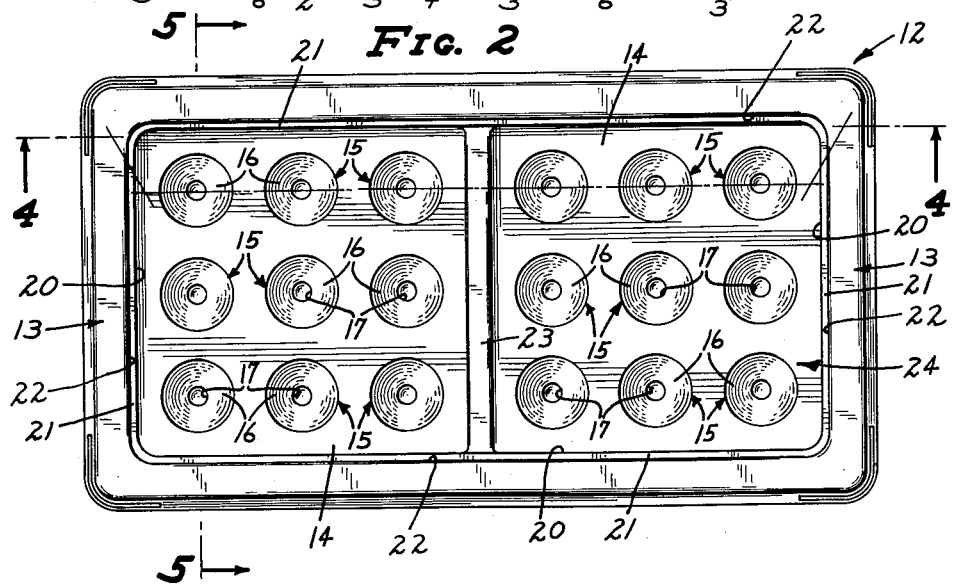
FIG. 2 is a view in top plan.
Figure 3:
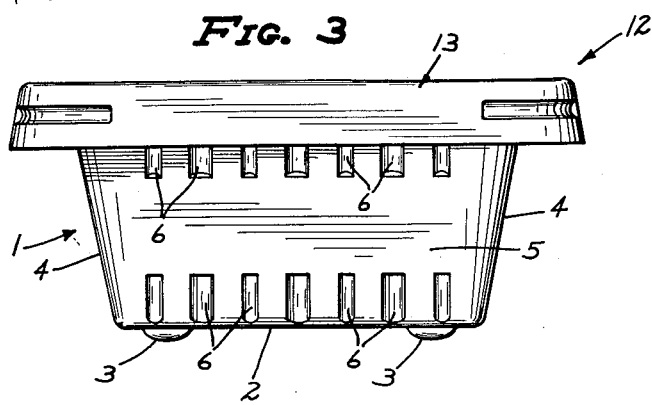
FIG. 3 is a view in end elevation.

Referring with greater particularity to the drawings, the numeral 1 indicates in its entirety a container preferably formed from any suitable light-weight, moisture-resistant material, such as molded plastic. Container 1 comprises a horizontal bottom 2, preferably and as shown depressed at laterally and longitudinally spaced points to provide feed 3, upwardly and outwardly flaring opposite side walls 4, and upwardly and outwardly flaring opposite end walls 5. Also preferably and as shown, the side and end walls 4, 5 are ribbed, as indicated at 6, for purposes of reinforcement. Suitable potting material, indicated by the letter X, is contained within the container 1 up to a predetermined level, as shown.

Above the level of the potting material X, the flaring side and end walls 4, 5 extend laterally outwardly to define a continuous horizontal marginal shoulder 7. From the shoulder 7, the walls 4, 5 extend generally upwardly as at 8, laterally outwardly as at 9, and finally generally downwardly as at 10 to define a relatively rigid marginal edge portion, identified in its entirety by the numeral 11.

Adapted to cooperate with the container 1, immediately above described, is a cover identified in its entirety by the numeral 12. Cover 12 is likewise formed from a suitable plastic sheet material, preferably transparent, and which is readily puncturable, for a purpose which will hereinafter become apparent. Cover 12 includes an inverted channel-shaped marginal edge portion 13 which, as shown, is adapted to be snugly received over the marginal edge portion 11 of the container 1. As shown particularly in FIGS. 4 and 5, the cover 12 includes a generally flat horizontal top wall 14 which is formed at longitudinally and laterally spaced points to provide a plurality of matching hollow dibbles, identified in their entirety by the numeral 15, which project into and are embedded within the potting material X. As shown, each of the dibbles 15 includes a downwardly tapering upper portion 16 and a reduced axially extended nipple-forming lower portion 17. Preferably and as shown, the nipple-forming lower end portions 17 of the dibbles 15 are elongated and define generally hemispherical closed bottom surfaces 18 and substantially vertical side surfaces 19 for the temporary adherence of seeds A thereto. As indicated in column 3, on page 2, of my earlier Patent 2,893,168, the seeds A are temporarily adhered to the dibbles 15 by suitable water soluble adhesive, to be released subsequently, and when germination is desired, by the insertion of a sharp pointed tool, such as a pencil B, into the dibbles 15 in a manner to cause puncturing of the fracturable material from which the cover 12 is formed, and thereafter introducing a prescribed amount of moisture into the potting material through the punctured dibbles 15.

The elongated generally vertical cylindrical side surfaces 19 of the dibbles 15 are important in that when seeds A are attached thereto, a maximum frictional engagement or brushing effect is imparted thereto by the potting material during removal of the cover 12 from the container 1, after suitable moistening of the adhesive by which they are secured to said surfaces 19, thus assuring germination of a maximum number of seeds A carried by the dibbles 15. Also preferably and as shown, the longitudinal axial dimensions of the nipple-forming lower end portions 17 of the dibbles 15 are substantially equal to the longitudinal axial dimensions of the downwardly tapering upper portions 16 thereof, the combined dimensions thereof being not greater than ¾ inch nor less than ½ inch. This arrangement and proportions provides a water-receiving well above each of the reduced nipple-forming lower portions 17 of the dibbles 15 while positioning the seeds A the desired distance below the upper surface of the potting material X for ideal germination.

At its marginal edge, the relatively flat top wall 14 of the cover 12 defines a continuous and unbroken upwardly and outwardly flaring marginal portion 20 which makes sealing engagement with the flaring walls 4, 5 of the container 1, above the level of the potting material X. Above the marginal portion 20 of the cover 12, a laterally outwardly projecting portion 21 is formed, which seats on the horizontal shoulder 7 of the container 1. Above the horizontal portion 21, the cover 12 is formed to provide a generally inverted U-shaped marginal portion 13 which is snugly received over and snapped onto the marginal edge portion 11 of the container 1. Longitudinally intermediate the opposite ends of the cover 12 is a transversely extended upstanding rib 23, which, as shown particularly in FIG. 4, terminates immediately below the level of the laterally outwardly projecting horizontal portion 21 of the cover 12 so as to permit uninterrupted engagement of said portion 21 with the horizontal shoulder 7 of the container 1.

The plotting material X within the container 1 is preferably light-weight vermiculite which is prone to gather and retain static electricity. Hence, it has been found that this granular material has a decided tendency to work its way out of the container 1 between the overlying marginal edge portions 11, 22. However, when the container 1 and cover 12 are built in accordance with my invention, as immediately above described, I find that this undesirable feature is reduced to a minimum.

In applying moisture to the potting material X after the hollow dibbles 15 have been punctured or fractured, as shown in FIG. 5, the upstanding marginal portion 22 of the cover 12 defines a reservoir 24 for the temporary accumulation of water.

My invention has been thoroughly tested and found to be completely satisfactory for the accomplishment of the above objects, and while I have disclosed a commercial embodiment thereof, I wish to make it clear that my invention may be capable of modification without departure from the scope and spirit of the appended claims.

What I claim is:

1. In a seed merchandizing and germinating package compirsing an open topped container having potting material to a predetermined level therein, a top for said container comprising a horizontal top wall formed from readily fracturable sheet material and having therein a plurality of longitudinally and laterally spaced hollow dibble forming portions which project into said potting material, each of said dibble forming portions including an enlarged downwardly tapering upper portion and a reduced longitudinally axially extended nipple-forming lower portion, said nipple-forming lower portion having a generally elongated cylindrical side wall adjoining said tapering upper portion, and a generally hemispherical wall closing the lower end of said cylindrical wall, and said cylindrical wall providing a water holding well on the inner surface of said nipple-forming portion and a continuous elongated seed adhering and positioning wall on the outer surface thereof.

2. The structure defined in claim 1 in which the longitudinal axial dimensions of said nipple-forming lower portion of each hollow dibble is substantially equal to the depth of said downwardly tapering upper portion thereof.

3. The structure as defined in claim 1, in which said container has a continuous upwardly and outwardly extending side wall above the level of potting material therein, a continuous horizontal marginal shoulder formed in said side wall adjacent the level of said potting material, and said top for said container having a continuous upstanding side wall, and a continuous horizontal marginal portion for seating and sealing engagement with the correspondingly formed shouldered portion of said side wall.

References Cited in the file of this patent

UNITED STATES PATENTS

| 523,991 | Oliver | Aug. 7, 1894 |
| 2,720,725 | Peerless | Oct. 18, 1955 |
| 2,893,168 | Kobs | July 7, 1959 |

FOREIGN PATENTS

| 776,418 | Great Britain | June 5, 1957 |